United States Patent [19]

Sumiyoshi et al.

[11] Patent Number: 4,938,306
[45] Date of Patent: Jul. 3, 1990

[54] FOUR-WHEEL-DRIVE VEHICLE HAVING A TORQUE TRANSMISSION COUPLING FOR ALWAYS TRANSMITTING THE TORQUE

[75] Inventors: Masaharu Sumiyoshi; Masaaki Noguchi, both of Aichi, Japan

[73] Assignee: Kabushiki Kaisha Toyota Chuo Kenkyusho, Aichi, Japan

[21] Appl. No.: 39,389

[22] Filed: Apr. 17, 1987

[30] Foreign Application Priority Data

Apr. 21, 1986 [JP] Japan .................... 61-91467

[51] Int. Cl.$^5$ .................. B60K 17/34; F16H 1/44; F16H 57/04
[52] U.S. Cl. ................... 180/233; 74/467; 180/247; 180/248; 180/249; 184/6.12
[58] Field of Search ............ 180/233, 247, 248, 249, 180/242; 192/85 AA, 103 F, 104 F; 74/710.5, 711, 467; 184/6.12

[56] References Cited

U.S. PATENT DOCUMENTS

| | | | |
|---|---|---|---|
| 3,894,446 | 7/1975 | Snoy et al. ........................ | 74/711 |
| 4,179,952 | 12/1979 | Keske et al. ..................... | 184/6.12 X |
| 4,280,583 | 7/1981 | Stieg ............................... | 180/250 |
| 4,442,729 | 4/1984 | Hayakawa ....................... | 184/6.12 X |
| 4,445,400 | 5/1984 | Sullivan .......................... | 192/85 AA |
| 4,452,100 | 6/1984 | Sullivan .......................... | 74/711 |
| 4,552,241 | 11/1985 | Suzuki ............................ | 180/249 |
| 4,605,087 | 8/1986 | Ashauer .......................... | 180/248 |
| 4,618,022 | 10/1986 | Hayashi .......................... | 180/233 |
| 4,624,355 | 11/1986 | Mroz ............................... | 192/85 AA |
| 4,739,678 | 4/1988 | Miura et al. ..................... | 74/467 X |

FOREIGN PATENT DOCUMENTS

| | | | |
|---|---|---|---|
| 759348 | 8/1980 | U.S.S.R. ......................... | 180/249 |
| 1310240 | 3/1973 | United Kingdom . | |
| 1394121 | 5/1975 | United Kingdom . | |
| 2038429 | 7/1980 | United Kingdom ............ | 74/713 |
| 2154522 | 9/1985 | United Kingdom . | |

Primary Examiner—Mitchell J. Hill
Attorney, Agent, or Firm—Oblon, Spivak, McClelland, Maier & Neustadt

[57] ABSTRACT

A full time-four-wheel-drive vehicle in which front and rear wheels are always connected to each other through a torque transmission coupling includes an engine; a transmission, a first differential which is driven through the transmission to drive one of a front and a rear wheel systems; a second differential which is drivingly connected to the other of the systems; and a torque transmission coupling which includes an input shaft which is drivingly connected to the transmission and the first differential, an output shaft which is drivingly connected to the second differential, an oil pump which is driven by the relative rotation between the input shaft and the output shaft to generate oil pressure corresponding to the speed of the relative rotation, and a friction clutch mechanism which engages the input shaft and the output shafts with each other by the oil pressure generated by the oil pump.

16 Claims, 11 Drawing Sheets

FOUR-WHEEL-DRIVE VEHICLE HAVING A TORQUE TRANSMISSION COUPLING FOR ALWAYS TRANSMITTING THE TORQUE

FIELD OF THE INVENTION

The present invention relates to a full time-four-wheel-drive vehicle in which front and rear wheels are always connected to each other through a torque transmission coupling.

BACKGROUND OF THE INVENTION

Torque applied to a tire through a drive shaft acts to propel a vehicle by the friction between the tire and the surface of the road for the vehicle. At that time, a slip takes place between the road surface and the tire. The ratio of the slip depends on the coefficient of friction between the tire and the road surface. The coefficient of friction fluctuates due to the states of the road surface and the tire, the grounding load upon the tire, the magnitude of the torque transmitted to the tire, the driving speed of the vehicle, and so forth.

As for an ordinary two-wheel-drive vehicle, high torque is transmitted to each driving wheel through a transmission at the start of the vehicle so that a large slip takes place between the road surface and the tire of the wheel. The torque transmitted through the transmission decreases as the driving speed of the vehicle rises, so that the ratio of the slip falls.

When the torque transmitted to the tire is so high that the tire slips, the torque does not fully act to propel the vehicle, resulting in drawbacks that motive power is wasted, fuel efficiency drops, and the moving property of the vehicle is adversely affected.

Particularly when the fluctuation in the coefficient of friction is large or the coefficient of friction is very small, as on a muddy road, a partially icy road, a snowy road, a graveled road, or the like, not only does the stability of movement of the vehicle fall, but also it arises that the stopping distance increases in the case of locking of the wheel in braking, and it is even impossible to maintain the direction of movement of the vehicle in the case of locking of the rear wheel (in particular, in braking).

For the above-mentioned reasons, it has recently been desired that a four-wheel-drive vehicle, which was developed primarily for use on bad roads and in which the driving power of an engine is dividedly transmitted to four wheels to eliminate the above-mentioned drawbacks and problems, be adopted for use under various environmental conditions, including use on paved roads.

Since a rotation speed difference arises between the front and rear wheels of the four-wheel-drive vehicle due to the turning radius difference between the front and the rear wheels at the time of turning of the vehicle, torsional torque is caused (a tight corner braking phenomenon) between the drive shafts for the front and the rear wheels if the turning is performed on a high-friction-coefficient road (such as a paved road), on which the driving wheel and the surface of the road are less likely to slip relative to each other. For that reason, different types of four-wheel-drive vehicles have been developed in order to prevent the deterioration of the moving property of each vehicle due to the torsional torque, the increase in the wear of the tire, the shortening of the life of the vehicle, and so forth.

One of the different types of four-wheel-drive vehicles is a part time four-wheel-drive vehicle in which the driver shifts the four-wheel drive to the two-wheel drive when running on a high-friction-coefficient road such as a paved road. Another one of the different types of four-wheel-drive vehicles is a full time-four-wheel-drive vehicle equipped with a center differential unit for dividedly transmitting motive power to a front and a rear wheel drive shafts. The other and final one of the different types four-wheel-drive vehicles is a full time-four-wheel-drive vehicle in which the front or rear wheels are always driven and in which the rear or front wheels are driven through a viscous clutch which transmits torque by the viscosity of silicone oil or the like.

Although the part time-four-wheel-drive vehicle can be manufactured at a relatively low cost, not only is it troublesome to shift between the two-wheel drive and the four-wheel drive, but also it is likely that the vehicle is slowly turned due to the mistake of the driver despite being set in the state of four-wheel drive and that the driver needs to switch the two-wheel drive to the four-wheel drive according to his or her experience at the time of occurrence of a slip of the driving wheel during the two-wheel drive. It is less likely that every driver can precisely find out the occurrence of the slip of the driving wheel and take appropriate action.

Since the full time-four-wheel-drive vehicle equipped with the center differential unit has a front wheel drive differential unit, which dividedly transmits motive power to the right and left front wheels, a rear wheel drive differential unit, which dividedly transmits motive power to the right and left rear wheels, and the center differential unit, the vehicle has a problem that no motive power is transmitted to any of the remaining three of four driving wheels when one wheel is caused to spin or loses the tire grip due to overhanging on the road side or ditch, a slip on an icy road, or the like. For that reason, the center differential unit is provided with a differential locking mechanism for locking a differential means built in the unit. The differential locking mechanism is of the mechanical type or the electronic control type. In the mechanical type, a differential rotation which takes place in the center differential unit is stopped through manual shifting when no motive power is transmitted to the three of the four driving wheels in order to put the vehicle into the state of direct-connection four-wheel drive. In the electronic control type, the speed of the vehicle, the angle of turning of the vehicle, the racing of the drive shaft, and so forth are detected by sensors in order to put the differential locking mechanism into a locking or unlocking state through an electronic controller. As for the mechanical type, it is difficult to set a differential locking start time point, the time point cannot be changed depending on the moving condition of the vehicle, and it is more difficult to automate the differential locking mechanism. As for the electronic control type, a device for controlling the differential locking mechanism is so complicated that the cost of production of the mechanism is very high.

Since the center differential unit comprises an input shaft which receives motive power transmitted from an engine through a transmission, a differential case connected to the input shaft, a pinion shaft which is driven by the differential case, pinions rotatably attached to the peripheral surface of the pinion shaft, a first side gear which is engaged with the pinion and connected to a first differential means for driving the front or rear wheels, a second side gear which is engaged with the pinion and connected to a second differential means for driving the rear or front wheels, and the differential locking mechanism which engages the differential case and the side gear with each other through mechanical operation or electronic control, the cost of production of the center differential unit is very high and the weight of the vehicle is increased.

In the four-wheel-drive vehicle having the viscous clutch, the clutch transmits the torque by the viscosity of the silicone oil or the like. For that reason, the magnitude of the torque transmitted through the viscous clutch from a transmission is proportional to a relative rotation speed. As shown in FIG. 11, the transmitted torque T increases as a parabola convex upward, along with the increase in the relative rotation speed S, so that the transmitted torque T is relatively high even when the relative rotation speed S is low. For that reason, a slight tight corner braking phenomenon tends to occur at the time of turning of the vehicle. When the relative rotation speed S is high (on a bad road, a snowy road, or the like, the coefficient of friction on which is small), the transmitted torque T levels off so that the magnitude of the torque is not enough. As for a partially icy road, the response to the sharp change in the surface friction coefficient of the road tends to be late. If high torque is to be transmitted in order to achieve good driving performance, the viscous clutch needs to be enlarged, resulting in increasing the weight of the vehicle and restricting the degree of spatial freedom of installation of the viscous clutch. Once the size, form, and so forth of the viscous clutch are determined, the relation between the transmission speed and the slip speed is fixed so that the relation cannot be controlled from outside.

OBJECT OF THE INVENTION

The present invention was made in consideration of the above-described circumstances.

Accordingly, it is an object of the present invention to provide a four-wheel-drive vehicle which does not have the above-described drawbacks and problems and fulfills the functions of four-wheel drive under all conditions and whose constitution and cost are simple and low, respectively.

SUMMARY OF THE INVENTION

The four-wheel-drive vehicle provided in accordance with the present invention comprises an engine; a transmission which is driven by the engine to change the speed of the output rotation of the engine; a first differential means which is driven through the transmission to drive one of a front and a rear wheel systems; a second differential means which is drivingly connected to the other of the front and the rear wheel systems; and a torque transmission coupling which includes an input shaft which is drivingly connected to the transmission and the first differential means, an output shaft which is drivingly connected to the second differential means, an oil pump which is driven by the relative rotation between the input and the output shafts to generate oil pressure corresponding to the speed of the relative rotation, and a friction clutch mechanism which engages the input shaft and the output shaft with each other by the oil pressure generated by the oil pump. The torque transmission coupling has such a property that the torque transmitted by the coupling is proportional to the speed of the relative rotation.

When the rotation speed of the wheels driven by the first differential means is higher than that of the wheels driven by the second differential means, a rotation speed difference takes place between the input and the output shafts, and the oil pump generates the oil pressure corresponding to the rotation speed difference. The oil pressure is applied to the friction clutch mechanism so that torque is transmitted from the input shaft to the output shaft depending on the magnitude of the oil pressure. When the torque is transmitted to the second differential means, the rotation speed of the wheels drivingly connected to the second differential means is raised to approach that of the wheels driven by the first differential means, thereby reducing the rotation speed difference between the input and the output shafts. In short, the torque transmission coupling to the output shaft thereof settles for a magnitude corresponding to the rotation speed difference which takes place depending on the environmental situation of the vehicle and the moving conditions thereof. In other words, a prescribed slip is always allowed.

In the low speed running of the vehicle, the absolute value of the speed of rotation transmitted to the first differential means is small, and the rotation speed of the input shaft is therefore small as well. Even if the speed of the rotation of the output shaft is zero or very low, the absolute value of the rotation speed difference between the input and the output shaft is small. In addition, the rising of the oil pressure generated by the oil pump at the low rotation speed is generally slow due to the internal leak of the pump. For these reasons, the torque transmitted through the friction clutch mechanism is very low, so that the input and the output shafts are allowed to slip relative to each other. As a result, torsional torque caused between a front and a rear wheel drive shafts at the time of slow turning of the vehicle is absorbed by the friction clutch mechanism to prevent a tight corner braking phenomenon.

In the high speed running of the vehicle, if the rotation speed of the wheels driven by the second differential means is even slightly lower (the rotation speed difference is 1 or 2%, for example) than that of the wheels driven by the first differential means, the absolute value of the rotation speed difference between the input and the output shafts is certain to increase, because the absolute value of the speed of rotation transmitted to the first differential means is large in proportion to the driving speed of the vehicle. Therefore, the torque transmitted through the friction clutch mechanism is also high, corresponding to the absolute value of the rotation speed difference between the input and the output shafts so that these shafts are maintained in a torque transmission state approximate to a directly connected state. For that reason, in the rapid running of the vehicle, the torque of the engine is transmitted to the front and the rear wheels, while the torque is divided nearly at a ratio of 50:50 between them, so that the stability of the running of the vehicle and the fuel efficiency thereof are enhanced.

Since the second differential means is always connected to the first differential means through the torque transmission coupling, it is not necessary to perform troublesome shifting between two-wheel drive and four-wheel drive as is done in the conventional part time-four-wheel-drive vehicle.

When some driving wheel slips during the running of the vehicle provided in accordance with the present invention, the rotation speed difference between the input and output shafts of the torque transmission coupling increases immediately so that the oil pressure corresponding to the rotation speed difference increases. Consequently, the friction clutch mechanism immediately acts to prevent the increase in the rotation speed difference between the input and the output shafts to keep the slipping driving wheel from skidding sideways. Excess torque is transmitted to the other non-slipping driving wheels instead of the slipping driving wheel, so that the torque of the engine transmitted through the transmission is dividedly transmitted to the first and the second differential means. Appropriate driving forces are thus automatically and constantly applied to the front and the rear driving wheels with good response.

Since the torque transmission coupling provided in accordance with the present invention comprises only the input shaft, the output shaft, the friction clutch mechanism, and the oil pump for engaging the clutch mechanism depending on the rotation speed difference between the input and the output shafts, as described above, the constitution of the coupling is simpler than that of the center differential unit of the full time-four-wheel-drive vehicle, the cost of production of the coupling is very low, and the weight of the four-wheel-drive vehicle provided in accordance with the present invention is reduced.

The relation between torque transmission and differential rotation in a four-wheel-drive vehicle according to the present invention is drawn as a convex quadratic curve, while the relation in the full-time-four-wheel drive vehicle equipped with the viscous clutch is drawn as a concave quadratic curve. Accordingly, when the differential rotation is increased, the transmitted torque in the vehicle of the present invention is higher than that in the vehicle with the viscous clutch by the difference between the two torques. So, when some wheel of the four-wheel-drive vehicle in accordance with the present invention slips, driving forces are applied to the other wheels with higher torque than that in the full-time-four-wheel-drive vehicle equipped with the viscous clutch.

When the front wheel system of the four-wheel-drive vehicle provided in accordance with the present invention is driven by the first differential means, torque is transmitted to the rear wheels at the side of the second differential means as long as the front wheels are not locked at the sharp braking of the vehicle. For that reason, an anti-locking effect is produced. In other words, the torque is transmitted to the rear wheels from the front wheels through the torque transmission coupling. This serves to prevent the early locking of the rear wheels, which would be likely to occur at the time of braking on a low-friction-coefficient road such as an icy road.

As described above, the four-wheel-drive vehicle provided in accordance with the present invention fulfills the functions of four-wheel drive well through the action of the compact, lighter weight torque transmission coupling which does not need an electronic controller of high production cost and whose constitution is relatively simple, so that the cost of production of the coupling is lower.

DETAILED DESCRIPTION OF EXEMPLARY EMBODIMENTS

Figure 1:
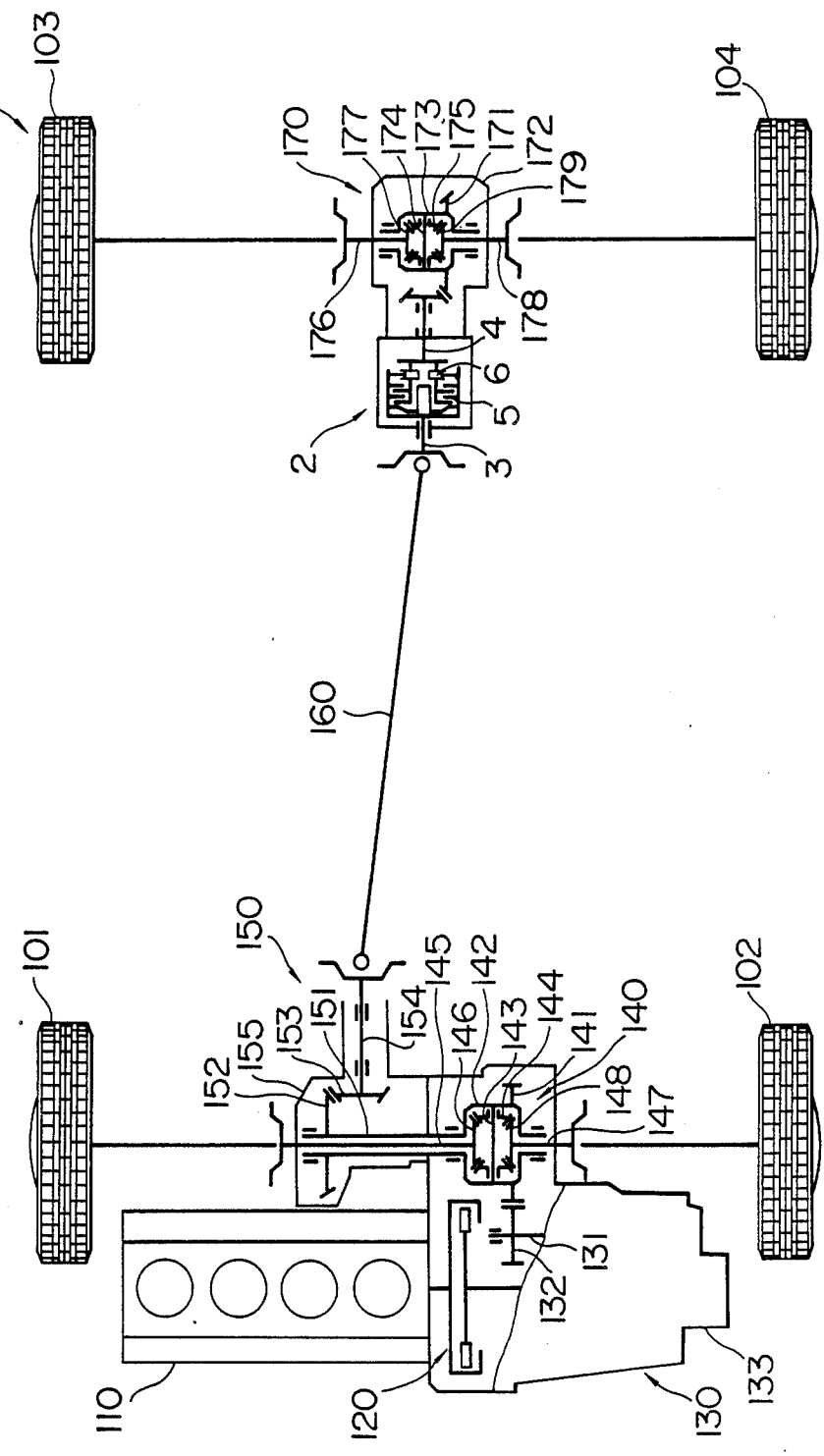
FIG. 1 shows a schematic view of the skeleton of a four-wheel-drive vehicle which is a concrete example of embodiment of the present invention and in which an engine is mounted crosswise in front of the front axle of the vehicle and a front wheel system is driven by a first differential means.

Embodiments of the present invention are hereafter described with reference to the drawings attached hereto.

In the first embodiment, which is a four-wheel-drive vehicle, an oil pump comprises a first rotary member which has a prescribed form and is provided on an input shaft so as to be rotated together therewith, and a second rotary member which has a prescribed form and is provided on an output shaft facing the first rotary member so as to be rotated together with the output shaft. When a rotation speed difference has arisen between the first and the second rotary members, oil pressure corresponding to the difference is generated.

In the second embodiment, which is a four-wheel-drive vehicle, an oil pump is provided between an input and an output shaft. A friction clutch mechanism for performing the torque-transmitting engagement of the input and the output shafts by oil pressure generated by the oil pump is provided between the input and the output shafts. These components are all compactly built in a transmission shaft system.

In the third embodiment, which is a four-wheel-drive vehicle, the crankshaft (not shown in the drawings) of an engine 110 extends perpendicularly across the direction of running of the vehicle, as shown in FIGS. 1, 3, 7, 9 and 10. Shown at 2, 120, 130, 140, 150 and 170 in the drawings are a torque transmission coupling, a motive power transmitter, a transmission, a first differential means, a transfer means, and a second differential means, respectively.

In the fourth embodiment, which is a four-wheel-drive vehicle, the crankshaft (not shown in the drawings) of an engine 110 extends in the same direction as the running of the vehicle, as shown in FIGS. 4, 5, 6, and 8. The same symbols in all the drawings denote the same components.

In the fifth embodiment, which is a four-wheel-drive vehicle, the center of gravity of an engine 110 is located in front of the front axle of the vehicle, as shown in FIGS. 1, 3, 4, 5 and 6.

Figure 7:
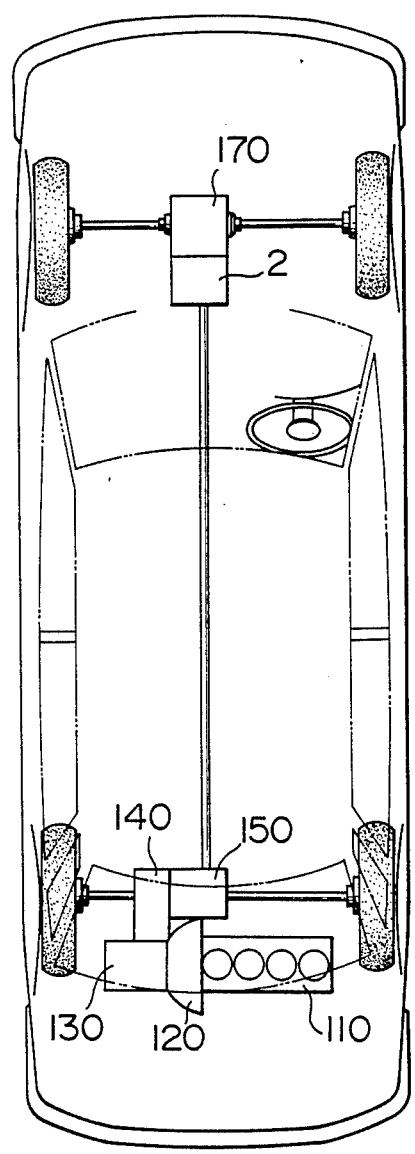
FIG. 7 shows a schematic view of the skeleton of a four-wheel-drive vehicle in which an engine is mounted crosswise behind the rear axle of the vehicle and a rear wheel system is driven by a first differential means.
Figure 8:
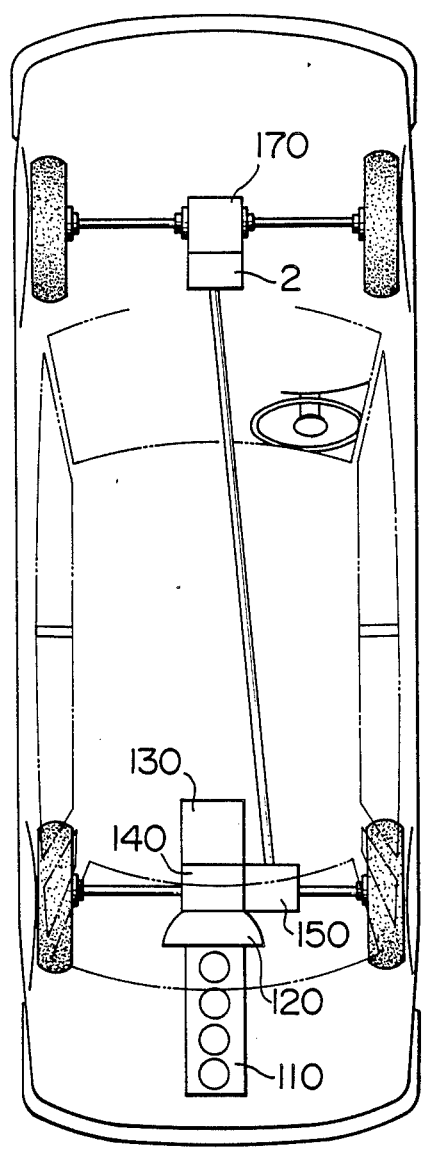
FIG. 8 shows a schematic view of the skeleton of a four-wheel-drive vehicle in which an engine is mounted lengthwise behind the rear axle of the vehicle and a rear wheel system is driven by a first differential means.

In the sixth embodiment, which is a four-wheel-drive vehicle, the center of gravity of an engine 110 is located behind the rear axle of the vehicle, as shown in FIGS. 7 and 8.

Figure 9:
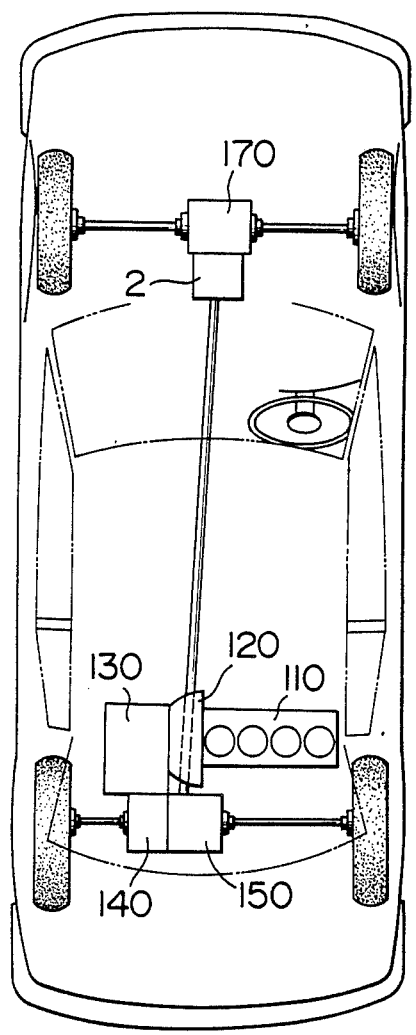
FIG. 9 shows a schematic view of the skeleton of a four-wheel-drive vehicle in which an engine is mounted crosswise between the front and rear axles of the vehicle and a rear wheel system is driven by a first differential means.
Figure 10:
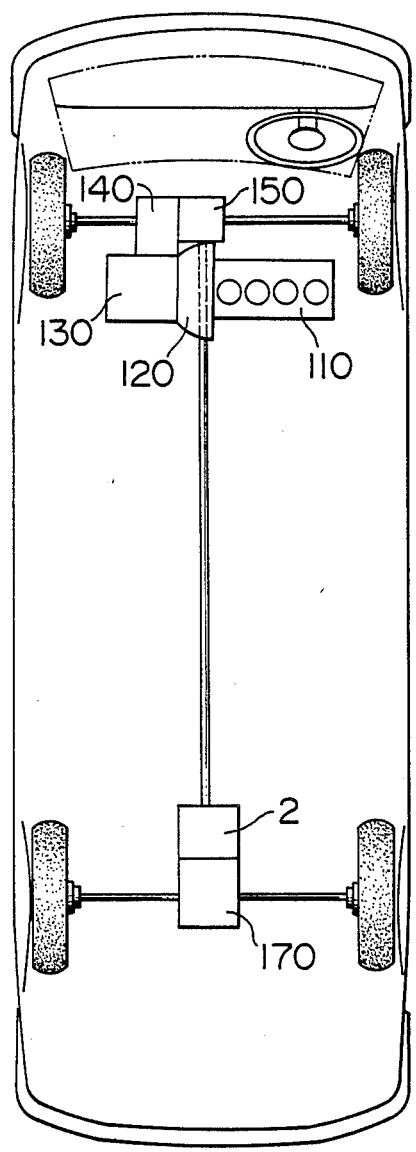
FIG. 10 shows a schematic view of the skeleton of a four-wheel-drive vehicle in which an engine is mounted crosswise between the front and rear axles of the vehicle and a front wheel system is driven by a first differential means.
Figure 11:
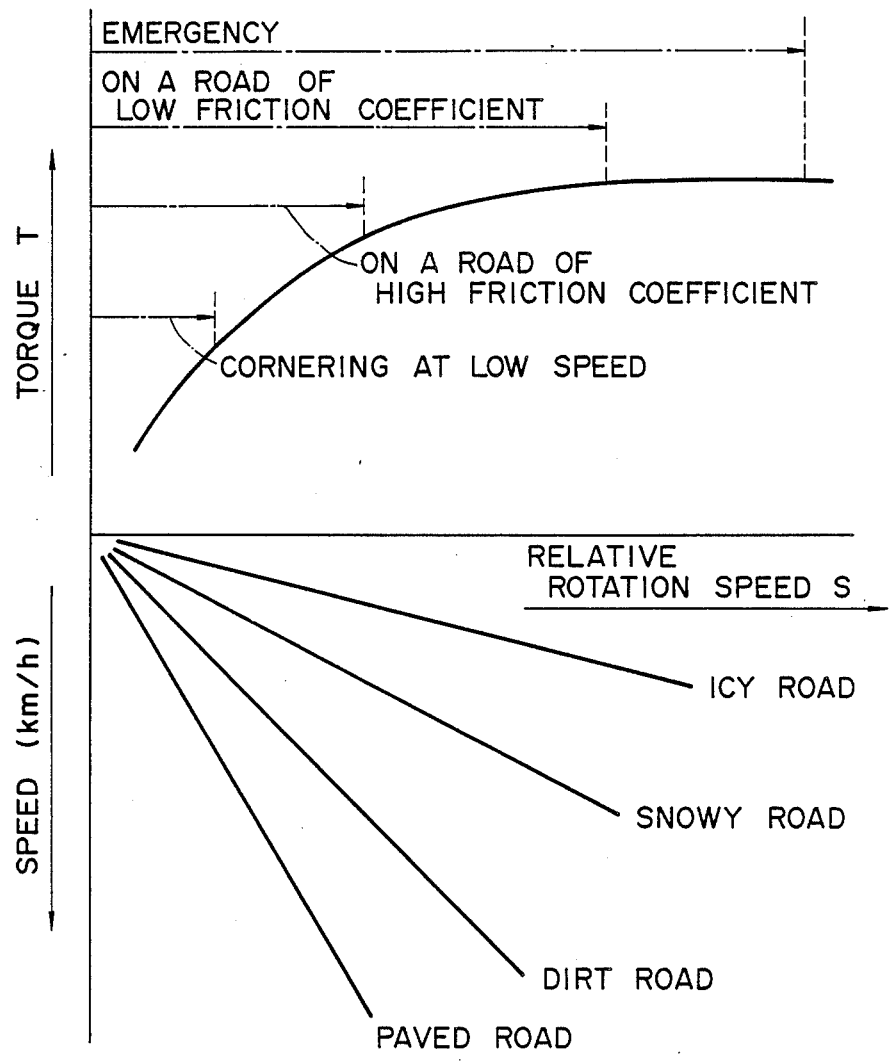
FIG. 11 shows graphs indicating the transmitting properties of a viscous clutch.

In the seventh embodiment, which is a four-wheel-drive vehicle, the center of gravity of an engine 110 is located between the front and the rear axles of the vehicle, as shown in FIGS. 9 and 10.

It will be understood from the third, the fourth, the fifth, the sixth, and the seventh embodiments that the present invention can be applied to a vehicle of any engine layout.

In the eighth embodiment, which is a four-wheel-drive vehicle, a front wheel system is driven by a first differential means 140, and a rear wheel system is driven by a second differential means 170, as shown in FIGS. 1, 3, 4, and 10.

In the ninth embodiment, which is a four-wheel-drive vehicle, a rear wheel system is driven by a first differential means 140, and a front wheel system is driven by a second differential means 170, as shown in FIGS. 5, 6, 7, 8, and 9.

It will be understood from FIGS. 8 and 9 that the present invention can be applied to a vehicle of any drive type.

In the tenth embodiment, which is a four-wheel-drive vehicle, an oil pump is supplied with working oil from a working oil feed pump driven by an input shaft whenever the vehicle is moving, so that the oil pump generates oil pressure corresponding to the rotation speed difference between the input and output shafts. Since oil pressure generated by the working oil feed pump is applied to a friction clutch mechanism while the oil pressure overlaps that generated by the oil pump, the rotation speed of the input shaft changes in proportion to the speed of the vehicle, so that the oil pressure generated by the working oil feed pump varies. For that reason, the engagement of the input and the output shafts by a friction clutch mechanism is made stronger as the speed of the vehicle increases. Since the engagement of the input and the output shafts is strong and the rotation speed of the friction clutch mechanism is high in the rapid running of the vehicle, the friction clutch mechanism receives centrifugal oil pressure corresponding to the speed of the vehicle, and therefore makes the engagement of the input and the output shafts stronger. For that reason, a first and a second differential means are almost directly connected to each other in the rapid running of the vehicle so that the torque or the engine is dividedly transmitted to the front and the rear wheel systems. As a result, the stability of the running of the vehicle and the fuel efficiency thereof are enhanced.

In the eleventh embodiment, which is a four-wheel-drive vehicle made as occasion demands, oil pressure corresponding to a vehicle moving condition such as the speed of the vehicle or the rotation speed of the engine is applied from an oil pressure feeder to an oil pump so that the oil pump generates oil pressure which is a superposition of both oil pressure corresponding to the vehicle moving condition and oil pressure corresponding to the rotation speed difference between the input and output shafts. For that reason, the oil pressure generated by the oil pressure feeder can be regulated by an electronic controller, for example, depending on the vehicle moving condition, in order to optionally control the degree of engagement of a friction clutch mechanism from outside.

In the twelfth embodiment, which is a four-wheel-drive vehicle, a friction clutch mechanism is made of a hydraulic multiple-disk clutch mechanism comprising a group of multiple engaged disks which are rotated together with an input shaft, another group of multiple engaged disks which are rotated together with an output shaft, and a means for pushing the groups of multiple engaged disks on each other by oil pressure generated by an oil pump. Since the hydraulic multiple-disk clutch mechanism is capable of transmitting higher torque through a smaller space than other types of clutch mechanisms such as a single-disk clutch mechanism and a conical clutch mechanism, the weight and size of the torque transmission coupling can be reduced.

A concrete example of embodiment of the present invention is hereafter described with reference to the drawings.

FIG. 1 shows a schematic view of the skeleton of a four-wheel-drive vehicle 1 which is the concrete example of embodiment. The vehicle 1 comprises an engine 100 which has a crankshaft (not shown in the drawing) extending perpendicularly across the direction of running of the vehicle and produces torque; a motive power transmitter 120 made of a friction clutch, a fluid clutch, or the like; a manual or automatic transmission 130 which changes the speed of rotation transmitted from the engine 110 through the motive power transmitter 120 and sends out the speed-changed rotation; a first differential means 140 which is driven by the transmission 130 to dividedly transmit motive power to a right and a left front wheels 101 and 102; a transfer means 150 for transmitting torque transmitted by the first differential means 140 to the rear wheels; a propeller shaft 160 for transmitting the output torque of the transfer means 150 rearward; a torque transmission coupling 2 for transmitting torque transmitted by the propeller shaft 160 to a second differential 170 depending on the condition of running of the vehicle; and a second differential means 170 which dividedly transmits the torque from the coupling 2 to the right and the left rear wheels 103 and 104.

The first differential means 140 comprises a large front gear 141 which is engaged with an output gear 132 driven by the output shaft 131 of the transmission 130; a front differential case 142 connected to the large front gear 141; a front shaft 143 which is driven by the front differential case 142; a front pinion 144 rotatably attached to the peripheral surface of the front shaft 143; a right front gear 146 which is engaged with the front pinion 144 to drive a right front wheel drive shaft 145; and a left front gear 148 which is engaged with the front pinion 144 to drive a left front wheel drive shaft 147. The first differential means 140 is provided in the case 133 of the transmission 130.

The transfer means 150 comprises a first transmission shaft 151 provided around the right front wheel drive shaft 145 so as not to hinder the rotation of the shaft and connected to the front differential case 142 of the first differential means 140; a bevel ring gear 152 attached to the peripheral surface of the first transmission shaft 151; a driven pinion 153 engaged with the bevel ring gear 152 so that the direction of torque transmitted to the first transmission shaft 151 is changed by a square angle and the torque is then transmitted rearward; and a second transmission shaft 154 connected at the front end thereof to the driven pinion 153 and at the rear end thereof to the front end of the propeller shaft 160. The transfer means 150 is housed in a transfer means case 155 clamped to the transmission case 133 near the first differential means 140.

The torque transmission coupling 2, which is provided in accordance with the present invention and which is of the rotation speed difference proportion type, comprises an input shaft 3 which is connected to the rear end of the propeller shaft 160; an output shaft 4 which is rotated in conjunction with the rear hypoid ring gear 171 of the second differential means 170; a friction clutch mechanism 5 for engaging and disengaging the input and the output shafts 3 and 4 with and from each other; an oil pump 6 which is driven by the rotation speed difference between the input and and the output shafts 3 and 4 to generate oil pressure; and a working oil feed pump 7 (see FIG. 2) for supplying working oil to the oil pump 6. The friction clutch mechanism 5, the oil pump 6, and the working oil feed pump 7 are connected to each other by a working oil feed/discharge means 8 made of a plurality of oil passages. The torque transmission coupling 2 is housed in a torque transmission coupling case 202 clamped by a plurality of bolts 201 to the front of a rear differential case 172 in which the second differential means 170 is housed.

Figure 2:
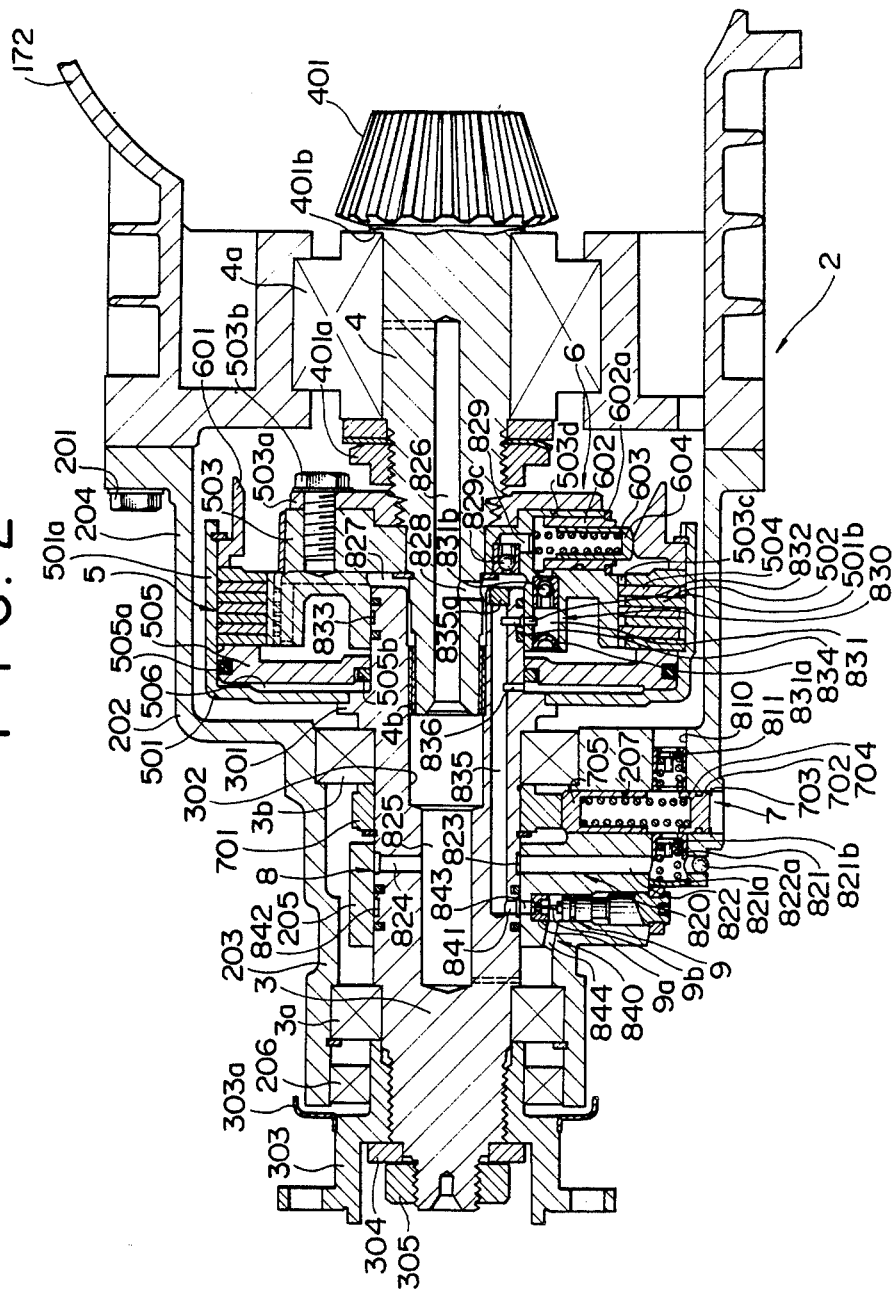
FIG. 2 shows a sectional view of a torque transmission coupling.

The torque transmission coupling 2 is hereafter described in detail with reference for FIG. 2. The torque transmission coupling case 202 comprises a front (left-hand in FIG. 2) portion 203 of small inside diameter and a rear (right-hand in FIG. 2) portion 204 of large inside diameter. The input shaft 3 is rotatably supported by bearings 3a and 3b provided at the front and rear of the front portion 203 of small inside diameter. The portion of the input shaft 3 which extends between the bearings 3a and 3b is surrounded by an intermediate support 205 provided on the torque transmission coupling case 202. A flange 301 is provided on the peripheral surface of the input shaft 3 at the front end of the rear portion 204 of large inside diameter. The rear central portion of the input shaft 3 is provided with a sliding contact hole 302 which is open rearward and into which the front end of the output shaft 4 is inserted.

A sleeve yoke 303, which is connected to the rear end of the propeller shaft 160, is spline-connected to the peripheral part of the front end portion of the input shaft 3. The sleeve yoke 303 is clamped with a spacer 304 to the input shaft 3 at the front end thereof by a nut 305. An oil seal 206 is fitted in the front end of the front portion 203 of small inside diameter so that oil stored in the torque transmission coupling case 202 is kept from flowing out from the front end of the front portion 203 of small inside diameter. A dust cover 303a is attached to the peripheral surface of the sleeve yoke 303 to prevent sand, gravel, or the like from clinging to the oil seal 206.

The rear portion of the output shaft 4 is located in the rear differential case 172. A plural-row conical roller bearing 4a is fitted in the rear differential case 172. The output shaft 4 is clamped to the bearing 4a by a nut 401a and a step 401b. The front end of the output shaft 4 is supported by a metal bearing 4b in the sliding contact hole 302 of the input shaft 3 coaxially therewith. The output shaft 4 is thus rotatably supported by the plural-row conical roller bearing 4a so that the input and output shafts 3 and 4 are kept coaxial with each other by the metal bearing 4b. A rear differential drive gear 401, which is engaged with the rear hypoid ring gear 171 of the second differential means 170, is provided at the rear end of the output shaft 4.

The friction clutch mechanism 5 is a hydraulic multiple-disk clutch mechanism and comprises a hydraulic servo drum 501 secured to the peripheral surface of the flange 301 of the input shaft 3 and open rearward; a group 502 of multiple engaged disks which are spline-connected to the splines 501b of the inner circumferential part of the peripheral portion 501a of the drum 501 so as to be rotated together with the input shaft 3; a clutch hub 503 clamped by a plurality of bolts 503b to an output shaft connection member 503a spline-connected to the outer circumferential portion of the output shaft 4; another group 504 of multiple engaged disks which are disposed between the first group 502 of multiple engaged disks and spline-connected to the splines 503c of the outer circumferential portion of the clutch hub 503 so as to be rotated together with the output shaft 4; a frictionally-engaging annular piston 505 provided as a pushing means in accordance with the present invention and liquid-tightly fitted with an outer and an inner seal rings 505a and 505b between the peripheral portion 501a of the hydraulic servo drum 501 and the input shaft 3 so as to push the groups 502 and 504 of multiple engaged disks; and a hydraulic servo means 506 provided between the drum 501 and the piston 505 to drive the piston.

The oil pump 6 is a radial oil pump and has an oil pump cam 601 which is secured to the inside circumferential surface of the rear end part of the peripheral portion 501a of the hydraulic servo drum 501 and whose inside circumferential surface is formed as a cam surface repeatedly protruded and recessed at angular intervals of 72°, for example. The clutch hub 503 inside the oil pump cam 601 is provided with holes 503d extending radially and open at the peripheral surface of the clutch hub. The holes 503d are located at angular intervals of 180°, for example. Sleeves 602 are liquid-tightly fitted with oil seals in the holes 503d and held in the holes 503d by sleeve holding rings 602a fitted on the peripheral surface of the clutch hub 503. A compressed helical spring 603 and a plunger 604 are provided in each of the sleeves 602. The springs 603 function to always keep the tip of the plunger 604 in contact with the cam surface of the oil pump cam 601.

The working oil feed pump 7 is a radial oil pump as well as the oil pump 6 and has a working oil feed pump cam 701 secured to the peripheral surface of the input shaft 3 adjacent to the front of the bearing 3b and provided with a cam surface which performs a retractive and protrusive motion during rotation of the cam. The torque transmission coupling case 202 is provided with a hole 207 under (as shown in FIG. 2) the cam 701. An oil plug 702 is supported by a holding ring 703 for cooperating with an oil seal to prevent working oil from flowing out down through the hole 207. The plug 702 is located in the lower (as shown in FIG. 2) portion of the hole 207. A compressed helical spring 704 and a plunger 705 are provided in the hole 207 over (as shown in FIG. 2) the oil plug 702. The spring 704 functions to always keep the tip of the plunger 705 in contact with the cam surface of the working oil feed pump cam 701.

The working oil feed/discharge means 8 comprises a first oil feed passage 810 for supplying the working oil feed pump 7 with working oil stored in the lower portion of the torque transmission coupling case 202, a second oil feed passage 820 for supplying the oil pump 6 with the working oil discharged by the working oil feed pump 7, a third oil feed passage 830 for supplying the hydraulic servo means 506 of the friction clutch mechanism 5 with the working oil discharged from the oil pump 6, and a fourth oil feed passage 840 for draining the working oil to be supplied to the hydraulic servo means 506.

The first oil feed passage 810 connects the lower portion of the torque transmission coupling case 202 and the hole 207 between the oil plug 702 and the plunger 705 to each other and is fitted with a one-way valve 811 for causing the working oil to flow only in the direction from the lower portion of the case 202 toward the hole 207.

The second oil feed passage 820 comprises a first oil passage 821 which connects the hole 207 between the oil plug 702 and the plunger 705 and the torque transmission coupling case 202 to each other and is provided with a blind plug 821a at the case 202, a second oil passage 822 which connects the exterior of the torque transmission coupling case 202 and the interior of the intermediate support 205 to each other and is provided with a blind plug 822a at the case 202, a third oil passage 823 which is a circumferential groove provided in the outside circumferential surface of the input shaft 3 and always located in contact with the opening of the second oil passage 822 at the intermediate support 205, a fourth oil passage 824 which is provided in the input shaft 3 in the radial direction thereof and whose outer end communicates with the third oil passage 823, a fifth oil passage 825 whose rear portion communicates with the sliding contact hole 302 and which communicates with the inner end of the fourth oil passage 824, a sixth oil passage 826 which is provided in the output shaft 4 along the axis thereof and whose front end is opened into the sliding contact hole 302 of the input shaft 3, a seventh oil passage 828 which connects the sixth oil passage 826 to a space 827 surrounded by the input shaft 3, the output shaft 4, the clutch hub 503, and the metal bearing 4b, and an eighth oil passage 829 which is provided in the clutch hub 503 and connects the space 827 and the inner end of the hole 503d to each other. A one-way valve 821b for causing the working oil to flow only in the direction from the hole 207 toward the first oil passage 821 is provided in the first passage 821. A one-way valve 829c for causing the working oil to flow only in the direction from the space 827 toward the hole 503d is provided in the eighth oil passage 829.

The third oil feed 830 comprises a ninth oil passage 831 extending between the front end of the clutch hub 503 and the inner end of the hole 503d and provided with a blind plug 831a at the front end of the ninth oil 831, a tenth oil passage 832 extending from the ninth oil passage 831 to the inside circumferential surface of the clutch hub 503 at which the outside circumferential surface of the input shaft 3 is located, an eleventh oil passage 833 which is a circumferential groove provided in the outside circumferential surface of the input shaft 3 and always located in contact with the inner end of the tenth oil passage 832, a twelfth oil passage 834 provided in the input shaft 3 in the radial direction thereof and communicating at the outer end of the twelfth oil passage 834 with the eleventh oil passage 833 and at the inner end of the twelfth oil passage 834 with a thirteenth oil passage 835, the thirteenth oil passage 835 provided in parallel with the sliding contact hole 302 and the fifth oil passage 825 from the rear end of the input shaft 3 to the interior of the intermediate support 205 and fitted with a blind plug 835a at the rear end of the thirteenth oil passage 835, and a fourteenth oil passage 836 which connects the thirteenth oil passage 835 and the hydraulic servo means 506 to each other. A one-way valve 831b is located in the ninth oil passage 831 for causing the working oil to flow only in the direction from the hole 503d toward the tenth oil passage 832.

The fourth oil feed passage 840 comprises a fifteenth oil passage 841 which connects the thirteenth oil passage 835 and a space between the intermediate support 205 and the peripheral surface of the input shaft 3 to each other, a sixteenth oil passage 842 which is a circumferential groove which is provided in the outside circumferential surface of the input shaft 3 and into which the fifteenth oil passage 841 is opened, a seventeenth oil passage 843 provided in the torque transmission coupling case 202 and always located at the inner end of the seventeenth oil passage 843 in contact with the sixteenth oil passage 842 so that the working oil supplied to the hydraulic servo means 506 is fed to a pressure control orifice means 9 for regulating the pressure of the working oil, and an eighteenth oil passage 844 for draining the working oil passed through the pressure control orifice means 9 into the torque transmission coupling case 202.

The pressure control orifice means 9 comprises an orifice member 9a and movable needle 9b inserted therein. The working oil supplied to the hydraulic servo means 506 is drained into the torque transmission coupling case 202 through the gap between the orifice member 9a and the movable needle 9b and the eighteenth oil passage 844.

The second differential means 170 comprises the rear hypoid ring gear 171 engaged with the rear differential drive gear 401 on the output shaft 4 of the torque transmission coupling 2, a rear differential case 173 connected to the rear hypoid ring gear 171, a rear shaft 174 which is driven by the rear differential case 173, a rear pinion 175 rotatably attached to the peripheral surface of the rear shaft 174, a right rear gear 177 engaged with the rear pinion 175 to drive a right rear drive shaft 176, and a left rear drive shaft 178. The second differential means 170 is provided in the rear differential case 172.

The ratio of speed reduction by the bevel ring gear 152 and driven pinion 153 of the transfer means 150 and the ratio of speed augmentation by the rear differential drive gear 401 and the rear hypoid ring gear 171 are set to be equal to each other so that the rotation speed of the front differential case 142 of the first differential means 140 and that of the rear differential case 173 of the second differential means 170 are equal to each other when the rotation speeds of the input and output shafts 3 and 4 of the torque transmission coupling 2 are equal to each other.

The operation of the torque transmission coupling 2 is hereafter described. When the torque is transmitted to the input shaft 3, the working oil feed pump cam 701 is rotated by the rotation of the input shaft 3 so that the plunger 705 of the working oil feed pump 7 is reciprocated in the hole 207. The working oil stored in the lower portion of the torque transmission coupling case 202 is sucked through the first oil feed passage 810 by the reciprocation of the plunger 705 so that the working oil is discharged into the second oil feed passage 820. Some of the working oil discharged into the passage 820 is then supplied to oil passages for the lubrication of various sections, and the rest of the working oil is supplied to the oil pump 6.

When a rotation speed difference arises between the input and the output shafts 3 and 4, the tip of the plunger 604 of the oil pump 6 slides on the cam surface of the oil pump cam 601 attached to the hydraulic servo drum 501, so that the plunger 604 in the sleeve 602 is reciprocated depending on the sliding motion of the tip of the plunger 604 on the cam surface. The working oil discharged by the working oil feed pump 7 is sucked through the second oil feed passage 820 by the reciprocation of the plunger 604 so that the working oil is discharged into the third oil feed passage 830.

Even if the oil pump 6 does not discharge the working oil, the working oil (except that supplied to the oil passages for the lubrication of the various sections) discharged by the working oil feed pump 7 is supplied to the third oil feed passage 830 through the oil pump 6.

The working oil supplied to the third oil feed passage 830 is drained through the fourth oil feed passage 840 in a quantity which is always determined by the pressure control orifice means 9.

Because of the above-described operation, oil pressure corresponding to the rotation speed of the input shaft 3 and oil pressure corresponding to the rotation speed difference between the input and the output shafts 3 and 4 are generated in the third oil feed passage 830, and oil draining is always performed by the pressure control orifice means 9.

The oil pressure in the third oil feed passage 830 is used as that in the hydraulic servo means 506. For that reason, when the ratio of oil sent to the third oil feed passage 830 by the working oil feed pump 7 and the oil pump 6 is larger than that of oil drained by the pressure control orifice means 9, the oil pressure in the hydraulic servo means 506 rises until the ratio of the sent oil and that of the drained oil balance each other. The oil pressure pushes the piston 505 to urge the groups 502 and 504 of multiple engaged disks so that torque proportional to the oil pressure is transmitted from the group 502 of multiple engaged disks to the other group 504 of multiple engaged disks. As a result, the torque is transmitted to the input shaft 3 and drives the output shaft 4 so that the rotation speed of the output shaft approaches that of the input shaft.

The operation of the four-wheel-drive vehicle which is the concrete example of embodiment is hereafter described.

(a) Low Speed Running

In the slow running of the vehicle, the speed of the rotation transmitted to the first differential means 140 is low, so the rotation speed of the input shaft 3 is also low. For that reason, the rotation speed difference between the input and the output shafts 3 and 4 is small, so the oil pressure generated by the oil pump 6 is low. Therefore, almost no torque is transmitted from the input shaft 3 to the output shaft 4, so the rear wheels 103, 104 of the vehicle function nearly as driven wheels of a two-wheel-drive vehicle. Because of this, torsional torque caused between the first and the second differential means 140 and 170 at the time of turning of the vehicle at a slow speed is absorbed by the slip of the friction clutch mechanism 5 so that a tight corner braking phenomenon is prevented.

(b) High Speed Running

The rapid running of the vehicle is, generally speaking, an almost straight running. Even if the vehicle is turned in rapid running, the radius of the turning is very large, so the rotation speed difference between the front and rear wheels of the vehicle is negligible. Since the absolute value of the speed of the rotation transmitted to the first differential means 140 and that of the rotation speed of the input shaft 3 are large, the absolute value of the rotation speed difference between the input and the output shafts 3 and 4 is large even if the rotation speed of the rear differential case 173 of the second differential means 170 is only 1 or 2% less than that of the front differential case 142 of the first differential means 140. In that case, the oil pressure generated by the oil pump 6, the degree of engagement of the input and the output shafts 3 and 4 and the degree of torque transmission therebetween are high. In the rapid running of the vehicle, the torque transmission to the second differential means 170 is increased, and the torque transmitted to the first differential means 140 is decreased, so the ratio between the torque transmitted to the first differential means 140 and that transmitted to the second differential means 170 approaches 50:50. In other words, the first and second differential means 140 and 170 are almost directly connected to each other, so the stability of the running of the vehicle and the fuel efficiency thereof are enhanced.

In the concrete example of embodiment, the working oil feed pump 7, which generates oil pressure corresponding to the rotation speed of the input shaft 3, is provided as a means for supplying the working oil to the oil pump 6. Since the rotation speed of the input shaft 3 is high in the rapid running of the vehicle, the oil pressure generated by the working oil feed pump 7 rises along with the increase in the speed of the running of the vehicle, and the oil pressure in the hydraulic servo means 506 also rises due to the centrifugal action. For that reason, the first and the second differential means 140 and 170 are almost directly connected to each other.

(c) Running On Road Surface With Small Coefficient Of Friction

When one of the front wheels of the vehicle slips or spins, the rotation speed of the input shaft 3 becomes higher than that of the output shaft 4, so the oil pressure generated by the oil pump 6 rises immediately. As a result, the input and the output shafts 3 and 4 are instantly engaged with each other as if the degree of slip of the front wheels were detected, so the torque transmitted from the first differential means 140 to the second differential means 170 increases. For that reason, appropriate driving forces are automatically applied to the rear wheels of the vehicle on the road surface with a small coefficient of friction, depending on the degree of slip of the front wheels.

Figure 3:
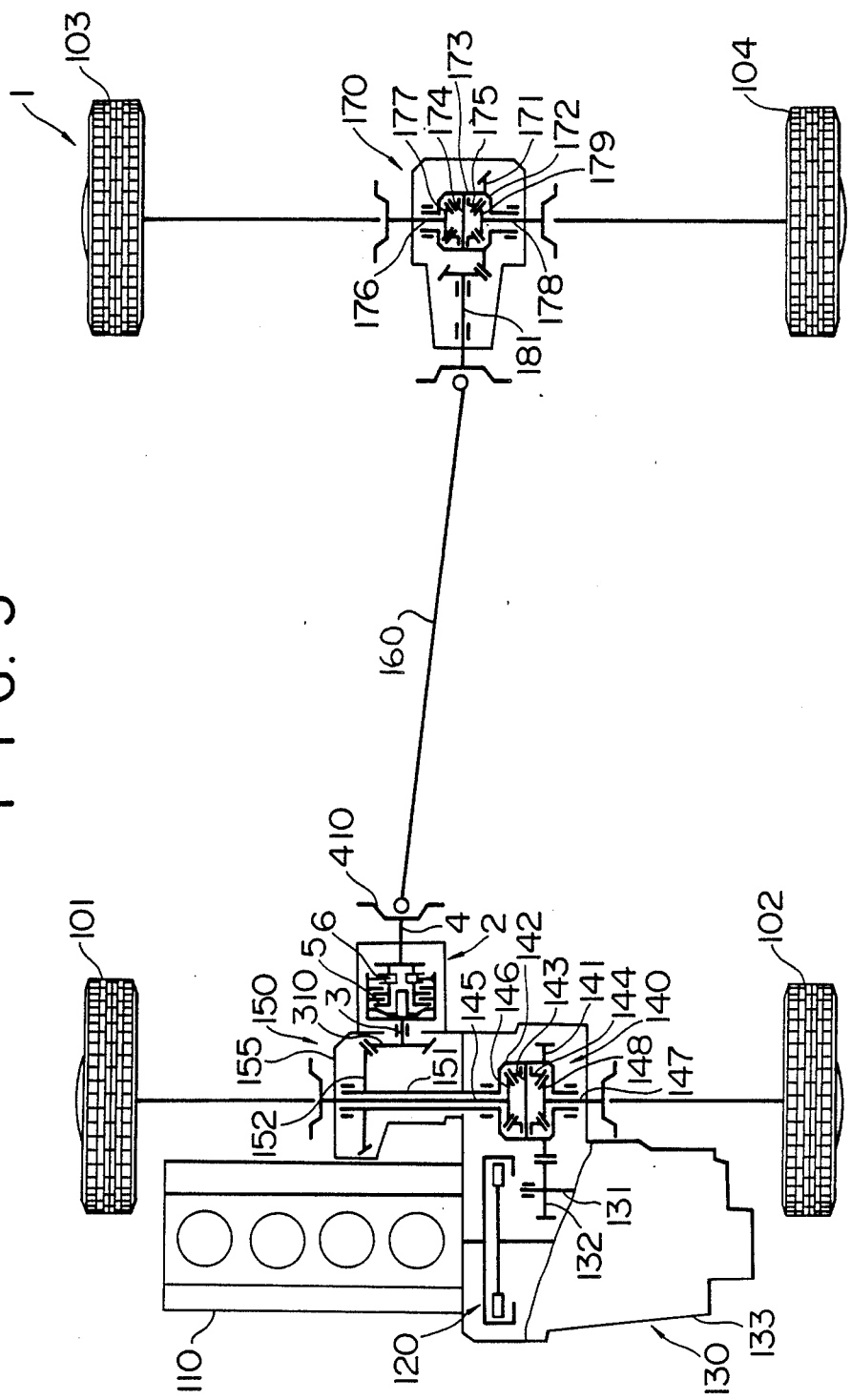
FIG. 3 shows a schematic view of the skeleton of a four-wheel-drive vehicle which is another concrete example of embodiment of the present invention and in which an engine is mounted crosswise in front of the front axle of the vehicle and a front wheel system is driven by a first differential means.

FIG. 3 shows a four-wheel-drive vehicle which is another concrete example of embodiment of the present invention. The same symbols in FIGS. 1 and 3 denote the same components. In the vehicle, a torque transmission coupling 2 is provided between a transfer means 150 and the front end of a propeller shaft 160 so that the bevel ring gear 152 of the transfer means 150 is engaged with a driven gear 310 provided at the front end of the input shaft 3 of the torque transmission coupling 2. A sleeve yoke 410, which is connected to the front end of the propeller shaft 160, is attached to the rear end of the output shaft 4 of the torque transmission coupling 2. The rear hypoid ring gear 171 of a second differential means 170 is engaged with a rear differential gear 181 whose front end is connected for the rear end of the propeller shaft 160 through a coupling.

Figure 4:
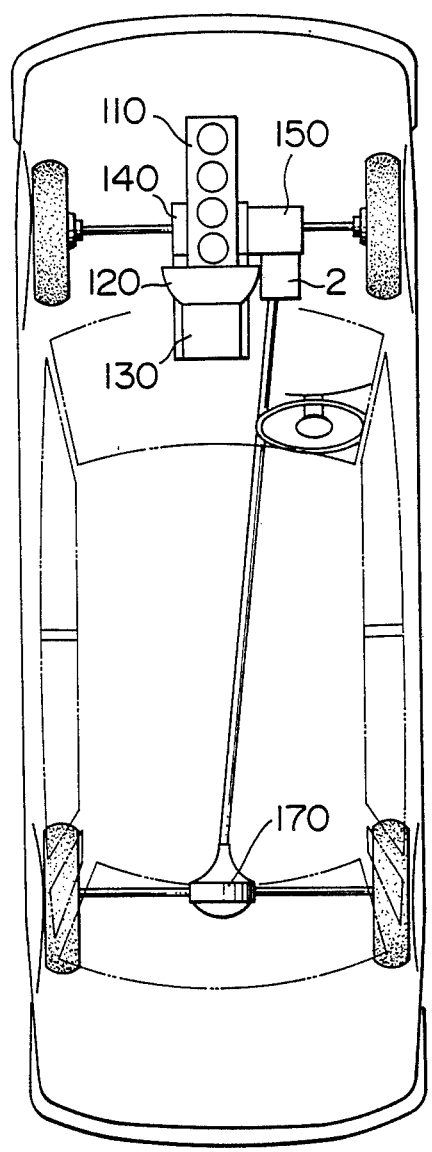
FIG. 4 shows a schematic view of the skeleton of a four-wheel-drive vehicle in which an engine is mounted lengthwise in front of the front axle of the vehicle and a front wheel system is driven by a first differential means.
Figure 5:
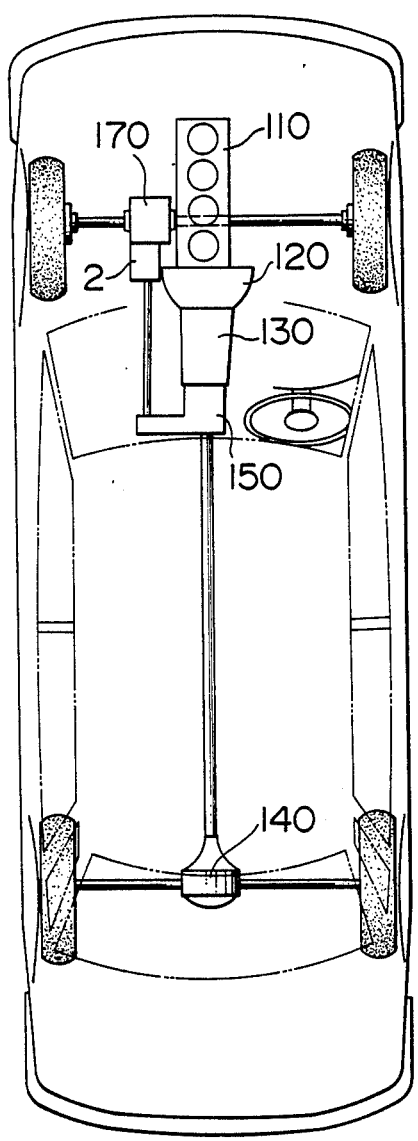
FIG. 5 and 6 show schematic views of the skeletons four-wheel-drive vehicles in each of which an engine is mounted lengthwise in front of the front axle of the vehicle and a rear wheel system is driven by a first differential means.
Figure 6:
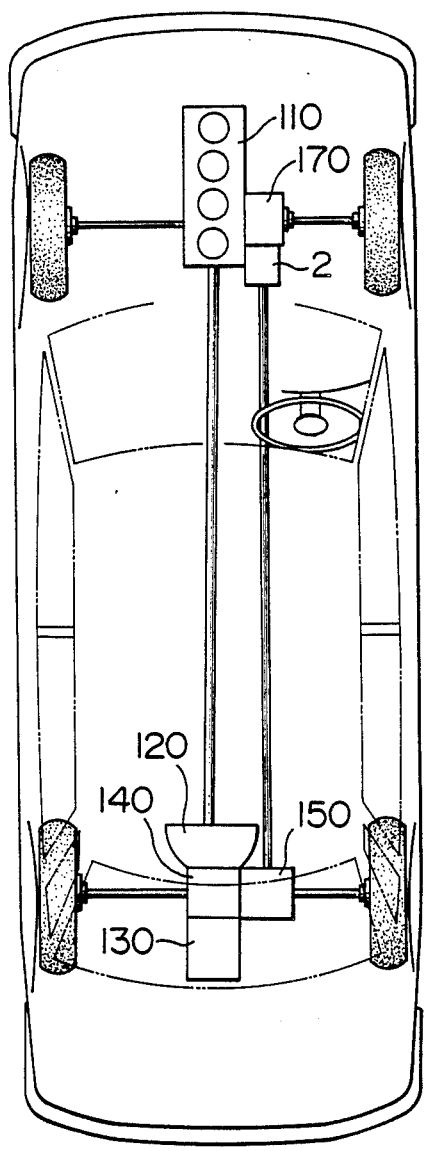

Although each of the above-described concrete examples of embodiment of the present invention is a four-wheel-drive vehicle in which an engine is mounted crosswise, the present invention can be also embodied as a four-wheel-drive vehicle in which an engine is mounted lengthwise as shown in FIGS. 4, 5, and 6. In the vehicle shown in FIG. 6, through a motive power transmission 120, a transmission 130, and a first differential means 140 are mounted on the rear-wheel side, the motive power transmitter 120 and the first differential means 140 may be mounted on the engine side.

Although each of the above-described concrete examples of embodiment of the present invention is a four-wheel-drive vehicle in which an engine is mounted in front of the front axle of the vehicle, the present invention can be also embodied as a four-wheel-drive vehicle in which an engine is mounted behind the rear axle of the vehicle, as shown in FIGS. 7 and 8, or between the front and rear axles thereof, as shown in FIG. 9.

Although the front wheels are driven by the first differential means and the rear wheels are driven by the second differential means in each of the above-described concrete examples of embodiment of the present invention, the present invention can be also embodied as a four-wheel-drive vehicle in which the rear wheels of the vehicle are driven by a first differential means and the front wheels of the vehicle are driven by a second differential means.

Although the oil pump in each of the above-described concrete examples of embodiment of the present invention is a radial oil pump, the oil pump may be another type of pump (such as a circumscribed gear pump, an inscribed gear pump, a trochoid pump, a van pump, a Roots pump, and an axial plunger pump) which is provided between an input and an output shafts to generate oil pressure by the rotation speed difference therebetween.

Although the working oil feed pump in each of the above-described concrete examples of embodiment of the present invention is a radial oil pump as a means for supplying the working oil to the oil pump, the working oil feed pump may be another type of oil pump or, instead of providing the working oil feed pump, either oil pressure generated by the oil pressure controller of an automatic transmission may be supplied to the oil pump or working oil may be supplied to the oil pump from an oil pressure feeder which generates oil pressure corresponding to the operation of the driver or the moving condition of the vehicle.

Although the friction clutch mechanism in each of the above-described concrete examples of embodiment of the present invention is a hydraulic multiple-disk clutch mechanism, the friction clutch mechanism may be another type of hydraulically engaged and disengaged clutch mechanism such as a single-disk clutch mechanism and a conical clutch mechanism if the friction clutch mechanism is built as a speed-proportion clutch mechanism which can transmit torque while being allowed to slip.

What is claimed is:

1. A four-wheel-drive vehicle comprising:
   (a) an engine having a crankshaft;
   (b) a transmission which is driven corresponding to the speed of the output rotation of said engine;
   (c) a first differential means which is driven by said transmission to drive one of a front wheel system and a rear wheel system:
   (d) a second differential means which is drivingly connected to the other one of said front and rear wheel systems; and
   (e) a torque transmission coupling which is provided between said first and second differential means and which includes:
      (i) an input shaft which is driven by said transmission via said first differential means;
      (ii) an output shaft which is drivingly connected to said second differential means;
      (iii) an oil pump which is always driven by the relative rotation between said input shaft and said output shaft to generate oil pressure in response to the speed of said relative rotation due to oil pressure supplied to said oil pump corresponding to the revolution of said engine; and
      (iv) a friction clutch mechanism which engages said input shaft and said output shaft with each other by said oil pressure generated by said oil pump.

2. A four-wheel-drive vehicle according to claim 1, wherein:
   (a) said oil pump comprises:
      (i) a first rotary member which is provided on said input shaft so as to be rotated together with said output shaft and
      (ii) a second rotary member which is provided on said output shaft facing said first rotary member so as to be rotated together with said output shaft and
   (b) the pressure of the enclosed oil is increased by the relative rotation between said first rotary member and said second rotary member at the time of occurrence of said relative rotation so that said oil is supplied to said friction clutch mechanism through a passage.

3. A four-wheel-drive vehicle according to claim 1, wherein:
   (a) said oil pump is provided between said input shaft and said output shaft;
   (b) said friction clutch mechanism is provided between said input shaft and said output shaft; and
   (c) said oil pump and said friction clutch mechanism are housed in a transmission shaft system.

4. A four-wheel-drive vehicle according to claim 1, wherein said crankshaft extends perpendicularly to the direction of running of said vehicle.

5. A four-wheel-drive vehicle according to claim 1, wherein said crankshaft extends in the direction of running of said vehicle.

6. A four-wheel-drive vehicle according to claim 1, wherein:

(a) said vehicle further comprises a front axle and
(b) said engine is mounted in front of said front axle.

7. A four-wheel-drive vehicle according to claim 1, wherein:
   (a) said vehicle further comprises a rear axle and
   (b) said engine is mounted behind said rear axle.

8. A four-wheel-drive vehicle according to claim 1, wherein:
   (a) said vehicle further comprises a front axle and a rear axle and
   (b) said engine is mounted between said front and rear axles.

9. A four-wheel-drive vehicle according to claim 1, wherein:
   (a) said front wheel system is driven by said first differential means and
   (b) said rear wheel system is driven by said second differential means.

10. A four-wheel-drive vehicle according to claim 1, wherein:
    (a) said rear wheel system is driven by said first differential means and
    (b) said front wheel system is driven by said second differential means.

11. A four-wheel-drive vehicle according to claim 1, wherein oil pressure corresponding to a vehicle moving condition is supplied from an oil pressure feeder which feeds oil to said oil pump.

12. A four-wheel-drive vehicle according to claim 1 wherein said friction clutch mechanism is a hydraulic multiple-disk clutch mechanism comprising:
    (a) a first group of multiple engaged disks which are rotated together with said input shaft;
    (b) a second group of multiple engaged disks which are rotated together with said output shaft; and
    (c) a push means for pushing said groups of multiple engaged disks against each other, said push means being actuated by the oil pressure generated by said oil pump.

13. A four-wheel-drive vehicle according to claim 2, wherein:
    (a) said first rotary member is an oil pump cam having a cam surface and
    (b) said second rotary member is a piston-type oil pump comprising a cylinder, a spring, and a plunger.

14. A four-wheel-drive vehicle comprising:
    (a) an engine having a crankshaft;
    (b) a transmission which is driven corresponding to the speed of the output rotation of said engine;
    (c) a first differential means which is driven by said transmission to drive one of a front wheel system and a rear wheel system:
    (d) a second differential means which is drivingly connected to the other one of said front and rear wheel systems; and
    (e) a torque transmission coupling which is provided between said first and second differential means and which includes:
       (i) an input shaft which is driven by said transmission via said first differential means;
       (ii) an output shaft which is drivingly connected to said second differential means;
       (iii) an oil pump which is driven by the relative rotation between said input shaft and said output shaft to generate oil pressure in response to the speed of said relative rotation, said oil pump being supplied with working oil from a working oil feed pump driven by said input shaft; and
       (iv) a friction clutch mechanism which engages said input shaft and said output shaft said oil pump.

15. A four-wheel-drive vehicle comprising:
    (a) an engine having a crankshaft;
    (b) a transmission which is driven corresponding to the speed of the output rotation of said engine;
    (c) a first differential means which is driven by said transmission to drive one of a front wheel system and a rear wheel system;
    (d) a second differential means which is drivingly connected to the other one of said front and rear wheel systems; and
    (e) means for coupling the transmission which is provided between said first and second differential means and which includes:
       (i) an input shaft which is driven by said transmission via said first differential means;
       (ii) an output shaft which is drivingly connected to said second differential means;
       (iii) an oil pump which is always driven by the relative rotation between said input shaft and said output shaft to generate oil pressure in response to the speed of said relative rotation; and
       (iv) a friction clutch mechanism which engages said input shaft and said output shaft with each other by said oil pressure generated by said oil pump, wherein:
    (f) oil pressure corresponding to a vehicle moving condition is supplied from an oil pressure feeder which feeds oil to said oil pump; and
    (g) said vehicle moving condition is the speed of said vehicle.

16. A four-wheel-drive vehicle comprising:
    (a) and engine having a crankshaft;
    (b) a transmission which is driven corresponding to the speed of the output rotation of said engine;
    (c) a first differential means which is driven by said transmission to drive one of a front wheel system and a rear wheel system;
    (d) a second differential means which is drivingly connected to the other one of said front and rear wheel systems; and
    (e) means for coupling the transmission which is provided between said first and second differential means and which includes:
       (i) an input shaft which is driven by said transmission via said first differential means;
       (ii) an output shaft which is drivingly connected to said second differential means;
       (iii) an oil pump which is always driven by the relative rotation between said input shaft and said output shaft to generate oil pressure in response to the speed of said relative rotation; and
       (iv) a friction clutch mechanism which engages said input shaft and said output shaft with each other by said oil pressure generated by said oil pump, wherein:
    (f) oil pressure corresponding to a vehicle moving condition is supplied from an oil pressure feeder which feeds oil to said oil pump; and
    (g) said vehicle moving condition is the speed of the output rotation of said engine.

* * * * *